(12) United States Patent
Andersson et al.

(10) Patent No.: US 10,082,086 B2
(45) Date of Patent: Sep. 25, 2018

(54) METHOD TO OPERATE A COMBUSTOR OF A GAS TURBINE

(71) Applicant: Siemens Aktiengesellschaft, Munich (DE)

(72) Inventors: Mats Andersson, Norrkoping (SE); Alessio Bonaldo, Norrkoping (SE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 189 days.

(21) Appl. No.: 14/653,082

(22) PCT Filed: Jun. 4, 2013

(86) PCT No.: PCT/EP2013/061439
§ 371 (c)(1),
(2) Date: Jun. 17, 2015

(87) PCT Pub. No.: WO2014/095094
PCT Pub. Date: Jun. 26, 2014

(65) Prior Publication Data
US 2016/0195023 A1    Jul. 7, 2016

(30) Foreign Application Priority Data

Dec. 21, 2012 (EP) .................................. 12199094

(51) Int. Cl.
*F02C 9/18* (2006.01)
*F02C 9/48* (2006.01)
(Continued)

(52) U.S. Cl.
CPC .................. *F02C 9/18* (2013.01); *F02C 3/13* (2013.01); *F02C 6/08* (2013.01); *F02C 9/16* (2013.01);
(Continued)

(58) Field of Classification Search
CPC ...... F02C 9/52; F02C 9/16; F02C 9/28; F02C 9/48; F02C 6/08; F02C 6/16; F02C 6/18;
(Continued)

(56) References Cited

U.S. PATENT DOCUMENTS

| 5,461,855 A | 10/1995 | Inoue et al. | |
| 5,533,329 A * | 7/1996 | Ohyama | F23R 3/26 60/39.27 |

(Continued)

FOREIGN PATENT DOCUMENTS

| CN | 1112190 A | 11/1995 |
| CN | 1932265 A | 3/2007 |

(Continued)

OTHER PUBLICATIONS

EP Office Action dated Feb. 1, 2017, for EP patent application No. 13726536.9.

(Continued)

*Primary Examiner* — Carlos A Rivera
*Assistant Examiner* — Thuyhang Nguyen
(74) *Attorney, Agent, or Firm* — Beusse Wolter Sanks & Maire

(57) ABSTRACT

A method to operate a combustor of a gas turbine is provided. The method includes monitoring the combustion gas temperature by temperature measurements downstream said combustor to measure a respective combustion gas temperature at different locations at respectively equal flow-distances to the burner of the combustion gas, comparing the temperature measurements, opening a valve or increasing the opening position of the valve to control the portion of oxygen containing gas to be tapped off when the comparison reveals that a difference between the temperature measurements exceeds a temperature difference threshold $\Delta T1$.

10 Claims, 4 Drawing Sheets

(51) Int. Cl.
*F02C 9/28* (2006.01)
*F02C 9/16* (2006.01)
*F23R 3/26* (2006.01)
*F23N 3/04* (2006.01)
*F23N 5/02* (2006.01)
*F23N 5/24* (2006.01)
*F23R 3/50* (2006.01)
*F02C 3/13* (2006.01)
*F02C 6/08* (2006.01)

(52) U.S. Cl.
CPC .................. *F02C 9/28* (2013.01); *F02C 9/48* (2013.01); *F23N 3/042* (2013.01); *F23N 5/022* (2013.01); *F23N 5/242* (2013.01); *F23R 3/26* (2013.01); *F23R 3/50* (2013.01); *F05D 2270/0831* (2013.01); *F23N 2025/08* (2013.01); *F23N 2037/02* (2013.01); *F23N 2037/20* (2013.01); *F23N 2041/20* (2013.01)

(58) Field of Classification Search
CPC .................. F02C 9/18; F05B 2270/303; F05B 2270/3032; F23R 3/26
See application file for complete search history.

(56) References Cited

U.S. PATENT DOCUMENTS

| | | | | |
|---|---|---|---|---|
| 5,609,016 | A * | 3/1997 | Yamada | F02C 3/22 60/39.281 |
| 6,778,937 | B2 * | 8/2004 | Cleary | F01D 17/085 60/286 |
| 6,889,495 | B2 * | 5/2005 | Hayashi | F23D 14/70 60/39.37 |
| 2002/0194851 | A1 | 12/2002 | Stalder et al. | |
| 2003/0046936 | A1 * | 3/2003 | Oechsle | F23R 3/007 60/748 |
| 2003/0167771 | A1 | 9/2003 | Hayashi et al. | |
| 2004/0182067 | A1 | 9/2004 | Nagata et al. | |
| 2007/0074516 | A1 | 4/2007 | Peck et al. | |
| 2007/0079593 | A1 * | 4/2007 | Fujii | F02C 7/1435 60/39.27 |

FOREIGN PATENT DOCUMENTS

| | | |
|---|---|---|
| CN | 1944985 A | 4/2007 |
| DE | 4417199 A1 | 11/1994 |
| EP | 0488766 A1 | 6/1992 |
| EP | 1251258 A2 | 10/2002 |
| EP | 1270902 A1 | 1/2003 |
| EP | 1533569 A1 | 5/2005 |
| RU | 2287066 C1 | 11/2006 |
| RU | 60637 U1 | 1/2007 |
| RU | 2342601 C1 | 12/2008 |

OTHER PUBLICATIONS

RU Office Action dated Mar. 24, 2017, for RU patent application No. 2015129829.
CN Office Action dated Aug. 9, 2017, for CN patent application No. 201380067057.7.

* cited by examiner

METHOD TO OPERATE A COMBUSTOR OF A GAS TURBINE

CROSS REFERENCE TO RELATED APPLICATIONS

This application is the US National Stage of International Application No. PCT/EP2013/061439 filed Jun. 4, 2013, and claims the benefit thereof. The International Application claims the benefit of European Application No. EP12199094 filed Dec. 21, 2012. All of the applications are incorporated by reference herein in their entirety.

FIELD OF INVENTION

The invention relates to a method to operate a combustor of a gas turbine wherein the gas turbine comprises a compressor, said combustor, generating combustion gas and a turbine and at least two temperature measurements downstream said combustor to measure a respective combustion gas temperature, wherein said compressor delivers an oxygen containing gas to the combustor, wherein said combustor comprises at least two burners and at least one combustion chamber downstream said at least two burners, wherein at least two of said at least two burners join commonly into said at least one combustion chamber to generate said combustion gas from burning fuel and said oxygen containing gas, wherein one extraction is provided to tap off at least a portion of the oxygen containing gas downstream said compressor and upstream said combustor, wherein said extraction comprises a valve to control the portion of the oxygen containing gas to be tapped off, wherein said method comprises a step of monitoring the combustion gas temperature by said at least two temperature measurements.

BACKGROUND OF INVENTION

On gas turbines, especially with annular combustors, it can occur that undesirable emissions like carbon monoxide are temporarily increased above acceptable levels (usually for several minutes or hours) due to flame out of one burner of the plurality of burners present in the combustor. Such a flame out can be maintained during stable load operation for several hours. This temporary increase in emissions—especially carbon monoxide emissions—can lead to an infringement of a contractual agreement on emission guarantees.

This problem up to now has been solved by changing orifice diameters in the coupling delivering gas fuel to the respective burners. The diameter of the orifice which is associated with the burner flaming out is usually changed to an orifice with larger diameter in order to deliver more gas fuel to this burner. This solution requires the gas turbine to be stopped at least for 30 minutes. Most often such a stop is not acceptable. Further the increased orifice diameter on one burner moves the flame out problem to another burner on a later date and is therefore not solving the issue completely.

Another conventional solution is to install manual valves in the fuel supply line upstream of each burner coupling and change their opening position while the gas turbine is in operation. This solution does not require the gas turbine to be shut down to solve the problem but it requires having expert personal at site to operate the manual gas valves.

SUMMARY OF INVENTION

The invention proposes a method to control a combustor according to the independent claim to solve the above described problem. The respectively dependent claims deal with further embodiments of the invention.

A gas turbine according to the invention normally comprises a compressor to compress oxygen containing gas, particularly air, further a downstream combustor generating combustion gas from a fuel to be burnt and the compressed oxygen containing gas respectively air and a downstream turbine being driven by the expansion of the hot combustion gas normally down to ambient pressure.

Such a gas turbine is described in DE 10 2008 044 442 A1.

Typically such a gas turbine comprises at least two temperature measurements in the hot gas path downstream the combustor to measure the combustion gas temperature on two different locations. Typically these two different locations are in one axial plane of said hot gas path of the gas turbine, wherein the axial plane refers to a turbine axis of the gas turbine defined by a gas turbine rotor of the turbine which rotor is impelled by the expansion of the hot gas. The location of the two thermocouples respectively temperature measurements is provided on two different streaks of the flow of the combustion gas generated by the combustor.

The invention recognized that increased emissions—especially carbon-monoxide emission—is often caused by a displacement of at least one flame front of at least one burner when several burners eject gas or a gas mixture to be burnt into a flame front of a common combustion chamber. If the flame front respectively one flame zone is displaced too far downstream the other flame fronts of adjacent burners are displaced, too, due to their coupling in air supply and pressure drop dependency on flame front position.

The invention further recognized that such an asymmetry causes temperature differences between the at least two temperature measurements in the downstream combustion gas path.

Further the invention recognized that in order to overcome the problem of the flame displacement it is beneficial to increase the flame temperature of all burners, including the burner with the displaced flame. This temperature increase has a beneficial effect on placing the flame front of the displaced flame zone again into the correct position. This effect is enabled since a hotter flame burns faster and is therefore more flexible to move into regions, where the local flow velocity is higher.

Basically the invention recognized that a decrease of air supply initiated by a temperature difference in the downstream exhausted gas removes a blocking of a single burner by a displaced frame front due to temperature increase in the combustor. In other words the flame front position is reset by opening the bypass valve when temperature differences are detected between different streaks of combustion gas downstream the combustor.

While conventionally manual adjustment of the burner operation and maybe even shutdowns of the gas turbine were necessary the invention enables to avoid high emission of especially carbon-monoxide by automatic control of an extraction valve position.

This leads to dramatic increase in availability and a decrease of commissioning time wherein the operation of the gas turbine becomes much easier and emissions are reduced as well.

The control method according to the invention is especially useful for annular combustion chambers being fired by a plurality of burners, which advantageously have a number between 4 and 32, and especially between 10 and 20. In such an annular combustor the influence between adjacent burners is significant.

In particular the fuel of the gas turbine to be burnt in the combustor is gaseous but can also be liquid fuel.

The extraction is advantageously a part of a bypass system, which taps off compressed oxygen containing gas from the outlet of the compressor before the oxygen containing gas would enter the combustor. This extraction or bypass system comprises at least one valve to open, partly open respectively throttle or close said bypass system, which is especially useful for part-load operation. If the extraction is made as a bypass system the extracted compressed air is re-injected into the path of the combustion gas downstream the combustor, especially into the turbine of the gas turbine. That way some amount of the compressed oxygen containing gas is bypassed to the combustor and expanded in the turbine.

The temperature measurements are advantageously located in the exhaust of the turbine and a control unit permanently compares the temperature measurements to detect significant differences. These temperature measurements are located in one common axial plane of the hot gas path to have measurements of different streaks of the hot gas at comparable locations to identify any asymmetry (asymmetry in the circumferential direction in case of a particular application in an annular combustor) of the combustion process. If at least one temperature measurement deviates significantly from the others at the same axial measurement plane a deviation above a certain threshold leads to the control measures according to the invention.

A further embodiment provides the control method according to the invention wherein the time of the increase of the opening of the bypass or extraction valve is between 5 seconds and 180 seconds. Particularly this time is between 10 seconds and 60 seconds to overcome the undesired flame front displacement downstream at least one of the burners.

BRIEF DESCRIPTION OF THE DRAWINGS

The above mentioned attributes, features and advantages will become more apparent and the invention will be better understood considering the following description of an embodiment of the invention in conjunction with the accompanying figures, showing.

DETAILED DESCRIPTION OF INVENTION

Figure 1:
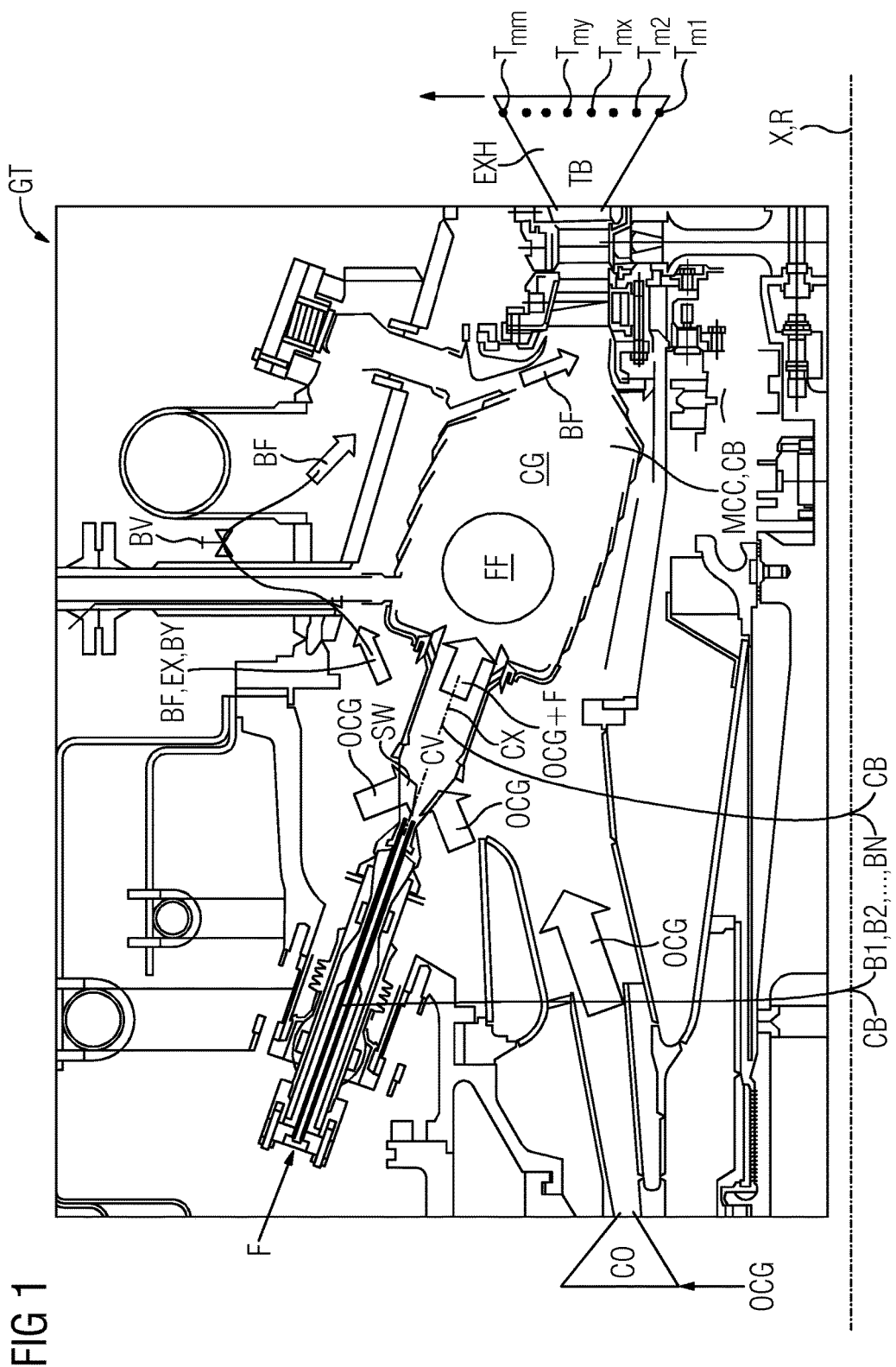
FIG. 1 a two-dimensional schematically depiction of the relevant part of a gas turbine to be controlled, FIG. 2 a flow diagram showing steps of a method to control according to the invention.

FIG. 1 shows a two-dimensional depiction schematically of a gas turbine GT to be controlled by a method according to the invention. Essential elements of the gas turbine GT comprise a compressor CO, a combustor CB and a turbine TB. Said compressor CO compresses and delivers an oxygen containing gas OCG, for example air, downstream to said combustors CB to be mixed with a gaseous fuel F and burnt by a plurality of burners B1, B2, . . . , Bn. Said burners B1, . . . , Bn respectively receive fuel F through a non depicted fuel line and eject said fuel F into a first cavity CV of said respective burner B1, B2, . . . , Bn along a central axis CX of said respective burner B1, B2, . . . , Bn. The burner B1, B2, . . . , Bn further comprises a swirler SW. Said swirler SW is located circumferentially around said central axis CX and injects oxygen containing gas OCG optionally mixed with fuel F inclined to said central axis CX into said cavity CV.

Downstream of the flow of said oxygen containing gas OCG and fuel F mixture said cavity CV opens wider into a main combustion chamber MCC. This main combustion chamber MCC is of annular shape extending circumferentially around a machine axis X. Said machine axis X is the axis of rotation of a gas turbine rotor R of the gas turbine GT turbine TB illustrated only by a symmetry line in FIG. 2. The rotor of the compressor CO also rotates around this axis X.

Said burners B1, . . . , Bn join said main combustion chamber MCC at several equidistant circumferential locations. A flame front FF with concentration spots at each burner exit of each cavity CV into said main combustion chamber MCC establishes during normal operation at a certain distance from the outlet of the cavity CV into the wider main combustion chamber MCC. Said mixture of fuel F and oxygen containing gas OCG entering said main combustion chamber MCC from said cavity CV is burnt pre-dominantly at the location of said flame front FF into combustion gas CG to be expanded in said turbine TB of said gas turbine GT.

Especially during part load operation of said gas turbine GT oxygen containing gas OCG is tapped off by an extraction EX upstream of said combustor CB respectively said burners B1, . . . , Bn. Said extraction EX is designed as a bypass BY and a bypass flow BF passes a bypass valve BV before said bypass flow BF enters the flow of said combustion gas CG downstream said main combustion chamber MCC to be expanded in said turbine TB. Said turbine TB comprises an exhaust EXH which is equipped with several temperature measurements TN1, . . . , TNX, . . . , TNY, . . . , TNN, which temperature measurements are located in a certain axial plane referring to the machine axis X. The locations of said temperature measurements TNX, TNY are chosen such that different streaks of the combustion gas CG flow are measured at comparable locations with regard to the distance to the burners B1, B2, . . . , Bn. If a malfunction occurs at one burner B1, . . . , Bn this occurrence might be reflected at a specific temperature measurement TNX such that a difference between the specific temperature measurement TNX and the other temperature measurements TN1, . . . , TNN might exceed a certain threshold $\Delta T1$.

Figure 2:
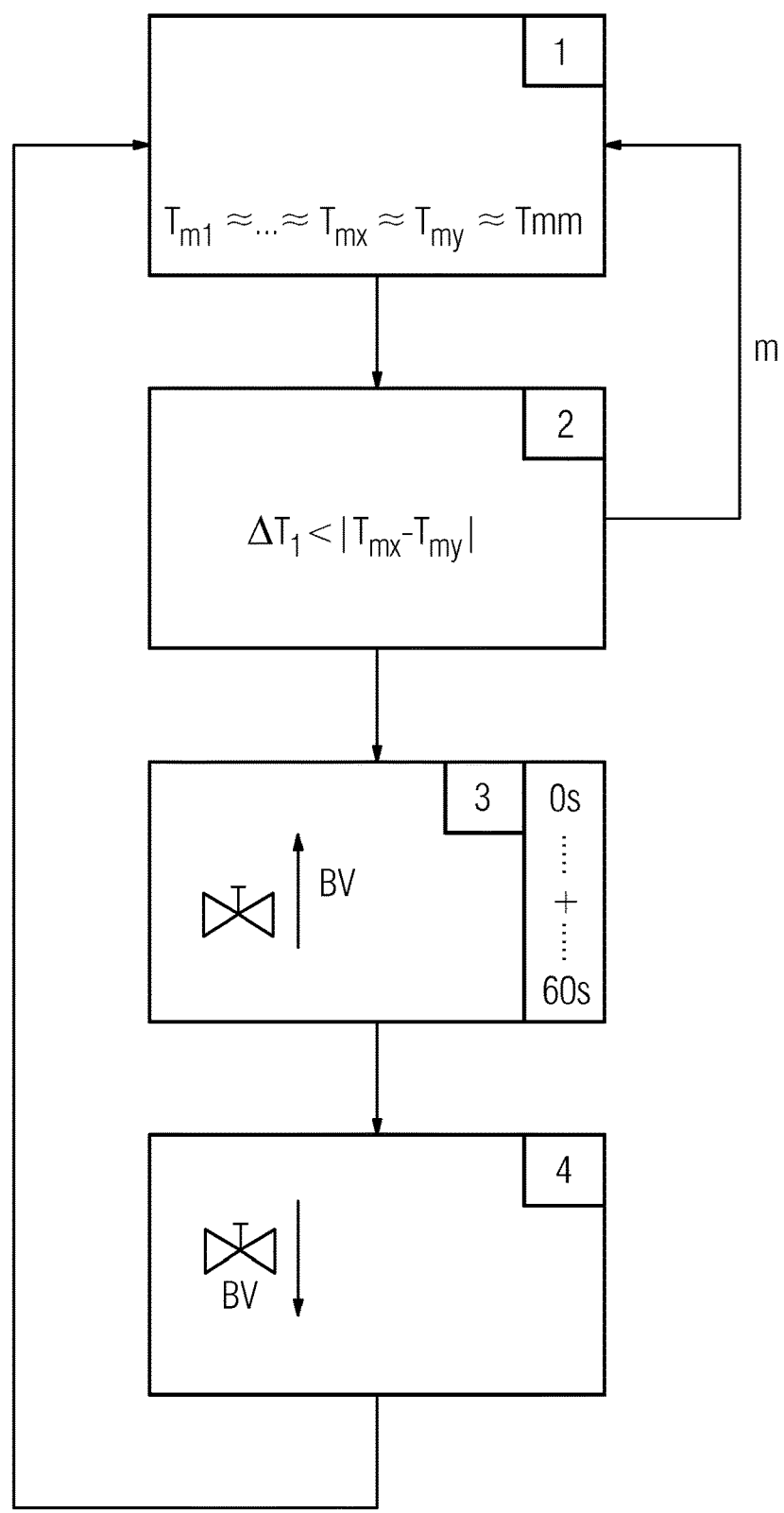

The invention therefore suggests a method according to the flow diagram, FIG. 2, wherein in a first step during operation of said gas turbine said temperature measurements TN1, . . . , TNY, . . . , TNX, . . . , TNN are continuously monitored and compared. In a second step the result of this comparison respectively a difference between two temperature measurements exceeding a first temperature difference threshold $\Delta T1$ might be recognized.

If this threshold is exceeded said bypass valve BV is opened or the opening position of said bypass valve BV is increased. If this threshold is not exceeded the monitoring is continued in step one. A predetermined opening time of 60 seconds later (T open) said bypass valve BV is closed or the opening position is decreased again as illustrated in step 4 of FIG. 2.

Opening said bypass valve less oxygen containing gas OCG is supplied to said main combustion chamber MCC respectively to each single burner B1, . . . , Bn. This change leads to an increase in temperature and the flame front FF in the main combustion zone MCC is relocated. This relocation effect is based on the higher velocity of the flame front FF in the main combustion chamber MCC due to the increase in temperature. By moving the flame front FF in same positions in front of the burners B1, . . . , Bn the flame front FF pressure drops are equalized again. That way potential asymmetries in the combustion are eliminated and all burners B1, . . . , Bn operate harmoniously.

Figure 3:
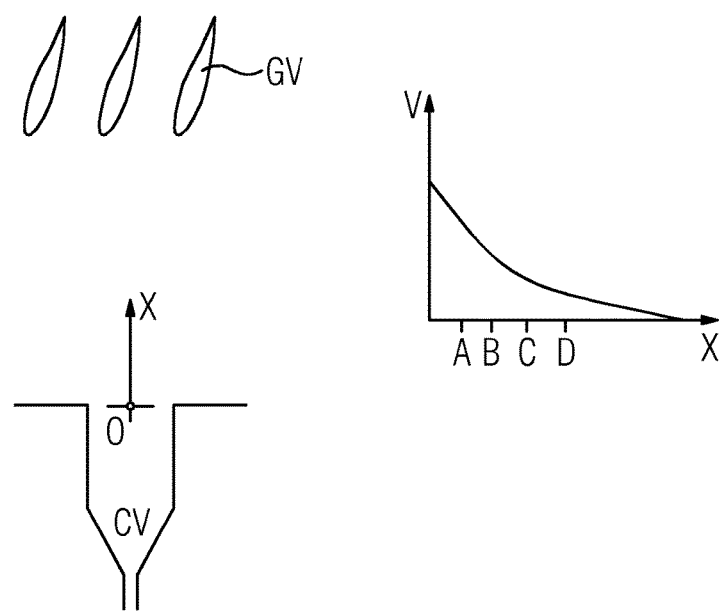
FIGS. 3-6 show an illustration of the inter-dependency of the flame front position of several adjacent burners.
Figure 4:
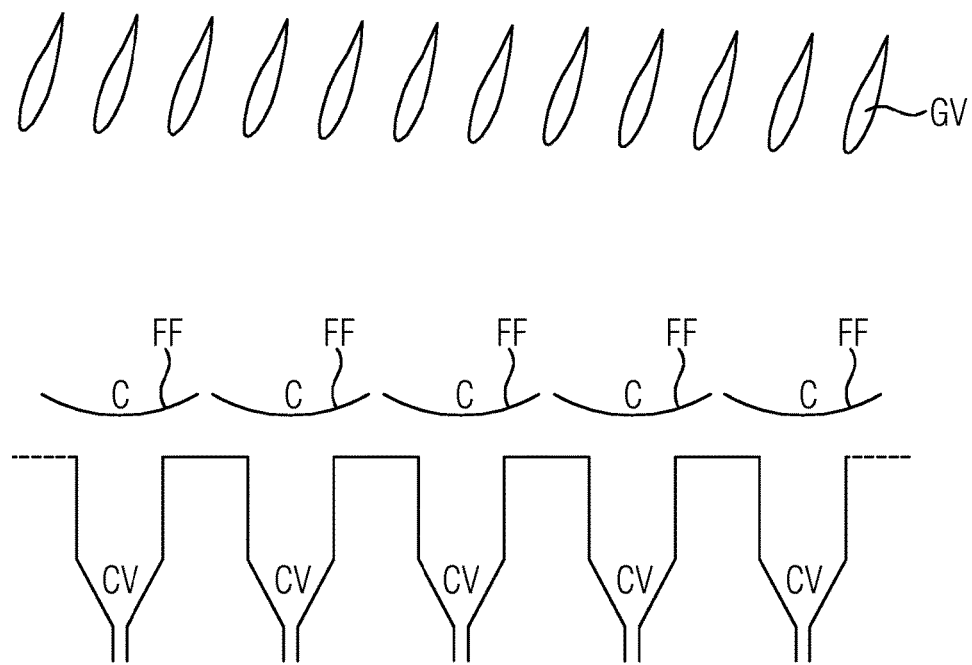

In FIG. 3 a schematic drawing of the combustion chamber section with one burner and the turbine inlet guide vanes GV is shown. In the burner cavity outlet a central point O is positioned which is also the origin of the axis X. Along the axis X are shown the local flow velocities v in the right hand side plot. The plot shows that the local flow velocity v along the axis X decreases with an incipiently steep slope which then reduces. The letters A, B, C and D refer to different flame front positions that are used in FIGS. 4, 5 and 6. The position C is considered here as the stable flame position for normal operation and in FIG. 4 it is shown the scheme of the combustion chamber with all the burners having the flame front FF in position C.

Figure 5:
Figure 6:

When one burner flame front is displaced in position D like it is shown in FIG. 5, all the other burners are subjected to a flame front position movement to B. This is due to the fact that a lower pressure drop is encountered by the air flow flowing through the burner with flame front D and therefore more air flow through this burner occurs. The air is consequently reduced in all other burners and their flame temperature is increased, consequently their flame speed is increased and they can move the flame front FF to position B. When a situation as shown in FIG. 5 happens, a difference in exhaust temperature measurements is observed. This increased difference will be used to trigger the temporary opening of the combustion bypass valves.

When opening the combustion bypass valves all flames on all burners will become hotter and their flame temperature increase will increase also their flame speed. All the burners flame fronts will be capable of moving to position A like shown in FIG. 6. When the flame front FF is in position A, the local oncoming flow speed is rapidly increasing with a small reduction of the distance X, like shown in FIG. 3. The steep change in local flow velocity in the region A allows the burner suffering of flame front FF displacement D to have its flame front back in position A. During this transition all the other burners cannot achieve closer flame front FF position to the CV outlet O because the local flow velocity is rapidly becoming too high for being compensated by their flame speed (FIG. 3). Considering that the flame front FF will stabilize at a position where the flame speed matches the oncoming flow speed, in the region X that is around the position A, it can be stabilized a larger range of flame speeds and therefore all burners will be easily characterized by the same flame position.

The operation with large opening in combustion bypass valves is characterized by unwelcome modifications of the combustor outlet temperature profile, with risk of damage to the turbine components (blades). It is therefore not possible to maintain all the flame fronts FF in position A for long time. The combustion bypass valves will be then closed to their standard operation position after a determined time and all the flame fronts FF will move to position C like shown in FIG. 4.

The invention claimed is:

1. A method of operating a combustor of a gas turbine engine, wherein the gas turbine engine comprises a compressor, said combustor, and a turbine,
   wherein said compressor delivers an oxygen containing gas to said combustor, wherein said combustor comprises at least two burners and at least one main combustion chamber downstream of said at least two burners,
   wherein at least two of said at least two burners join commonly into said at least one main combustion chamber to generate combustion gas from burning fuel and said oxygen containing gas,
   wherein one extraction is provided to tap off at least a portion of the oxygen containing gas downstream of said compressor and upstream of said combustor, and wherein said extraction is part of a bypass, wherein said bypass bypasses said combustor and joins into a hot gas path downstream said combustor,
   wherein said extraction comprises a valve to control the portion of the oxygen containing gas to be tapped off, said method comprising:
      monitoring combustion gas temperatures via respective temperature measurements taken at different locations at respectively equal axial flow-distances downstream of the at least two burners of the combustion gas,
      comparing two temperatures of said temperature measurements,
      opening said valve or increasing an opening position of said valve when said comparison reveals that a difference between said two temperatures of said temperature measurements exceeds a temperature difference threshold.

2. The method according to claim 1, wherein said oxygen containing gas is air.

3. The method according to claim 1, wherein said at least one main combustion chamber is an annular combustion chamber.

4. The method according to claim 1, wherein the number of burners of the at least two burners is between 4 and 24.

5. The method according to claim 1, wherein the number of burners of the at least two burners is between 10 and 20.

6. The method according to claim 1, wherein said fuel is a gas.

7. The method according to claim 1, wherein said temperature measurements are located in one axial plane of said gas turbine engine, wherein a reference axis of the axial plane is a machine axis X of said gas turbine engine and an axis of rotation of at least one rotor of said gas turbine engine.

8. The method according to claim 1, further comprising decreasing the opening of said valve or closing said valve after a predetermined time of opening said valve or of increasing the opening position of said valve respectively.

9. The method according to claim 8, wherein said predetermined time of opening is between 5 seconds and 180 seconds.

10. The method according to claim 8, wherein said predetermined time of opening is between 10 seconds and 60 seconds.

* * * * *